US007096747B1

(12) United States Patent
Hsieh

(10) Patent No.: US 7,096,747 B1
(45) Date of Patent: Aug. 29, 2006

(54) HAND TOOL WITH TWISTING FORCE MEASURING FUNCTIONS

(76) Inventor: Chih-Ching Hsieh, 235 Chung-Ho Box 8-24, Taipei (TW)

( * ) Notice: Subject to any disclaimer, the term of this patent is extended or adjusted under 35 U.S.C. 154(b) by 0 days.

(21) Appl. No.: 11/191,222

(22) Filed: Jul. 28, 2005

(51) Int. Cl.
*B23B 23/14* (2006.01)

(52) U.S. Cl. .................................................. 73/862.22

(58) Field of Classification Search ............. 73/862.21, 73/862.22
See application file for complete search history.

(56) References Cited

U.S. PATENT DOCUMENTS 5,503,028 A * 4/1996 Brihier .................... 73/862.21

* cited by examiner

*Primary Examiner*—Max Noori

(57) ABSTRACT

A hand tool with twisting force measuring functions comprises a driving portion having a driving head for screwing a screwing elements; a handle connected to the driving portion; the handle including a first lateral side and a second lateral side adjacent to the first lateral side; at least strain gauge installed in the first lateral side; at least one strain gauge installed in the second lateral side; an integrating element installed on the handle for calculating twisting forces of the tool body by measuring data from the strain gauges of the first and second lateral sides. The strain gauge in the first lateral side and second lateral side are connected with other circuit element as a Wheaston Bridge for measuring twisting force of the hand tool. The Wheaston bridge of the first lateral side is connected across one element of the Wheaston bridge of the second lateral side.

1 Claim, 4 Drawing Sheets

HAND TOOL WITH TWISTING FORCE MEASURING FUNCTIONS

FIELD OF THE INVENTION

The present invention relates to hand tools, and in particular to a hand tool with twisting force measuring functions, wherein the strain gauges are installed at two lateral sides of a hand tool so that the strain gauges at different sides have different axial deformations and thus precise twisting force values can be acquired.

BACKGROUND OF THE INVENTION

In driving a screw, it is often that the operator needs to know the tightness of the screw embedded into an object so as to determine whether a proper operation is achieved. If the screw is engaged too tight, it will cause it to be destroyed. If the screw is engaged too loose, it is possible that the screw is released from the object. Thereby in many applications, the hand tool is added with strain gauges for measuring the values of the twisting force applied thereto. Current hand tools are arranged with a strain gauge to measure the twisting force applied to the hand tool. In the prior art the sensitivity of the strain gauge is not so sensitive so that derived stresses are not precise and thus users cannot apply proper force according to the values. As a result, it is possible that the hand tool is destroyed or the screw means cannot be well fixed.

To improve above mentioned defect, in U.S. Pat. No. 3,970,155, a spanner with strain gauges is disclosed, where two strain gauges are installed at the driving portion and the driving head. The strain gauges are connected to a calculator and a display in the handle portion of the hand tool. However this design cannot precisely calculate the twisting value and thus the operator cannot get precise values.

SUMMARY OF THE INVENTION

Accordingly, the primary object of the present invention is to provide a hand tool with twisting force measuring functions, wherein the strain gauges are installed at two lateral sides of a hand tool so that the strain gauges at different sides have different axial deformations and thus precise twisting force values can be acquired.

To achieve above objects, the present invention provides a hand tool with twisting force measuring functions which comprises a driving portion having a driving head for screwing a screwing elements; a handle connected to the driving portion; the handle including a first lateral side and a second lateral side adjacent to the first lateral side; at least strain gauge installed in the first lateral side; at least one strain gauge installed in the second lateral side; an integrating element installed on the handle for calculating twisting forces of the tool body by measuring data from the strain gauges of the first and second lateral sides. The strain gauge in the first lateral side and second lateral side are connected with other circuit element as a Wheaston Bridge for measuring twisting force of the hand tool. The Wheaston bridge of the first lateral side is connected across one element of the Wheaston bridge of the second lateral side.

The various objects and advantages of the present invention will be more readily understood from the following detailed description when read in conjunction with the appended drawing.

DETAILED DESCRIPTION OF THE INVENTION

In order that those skilled in the art can further understand the present invention, a description will be described in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
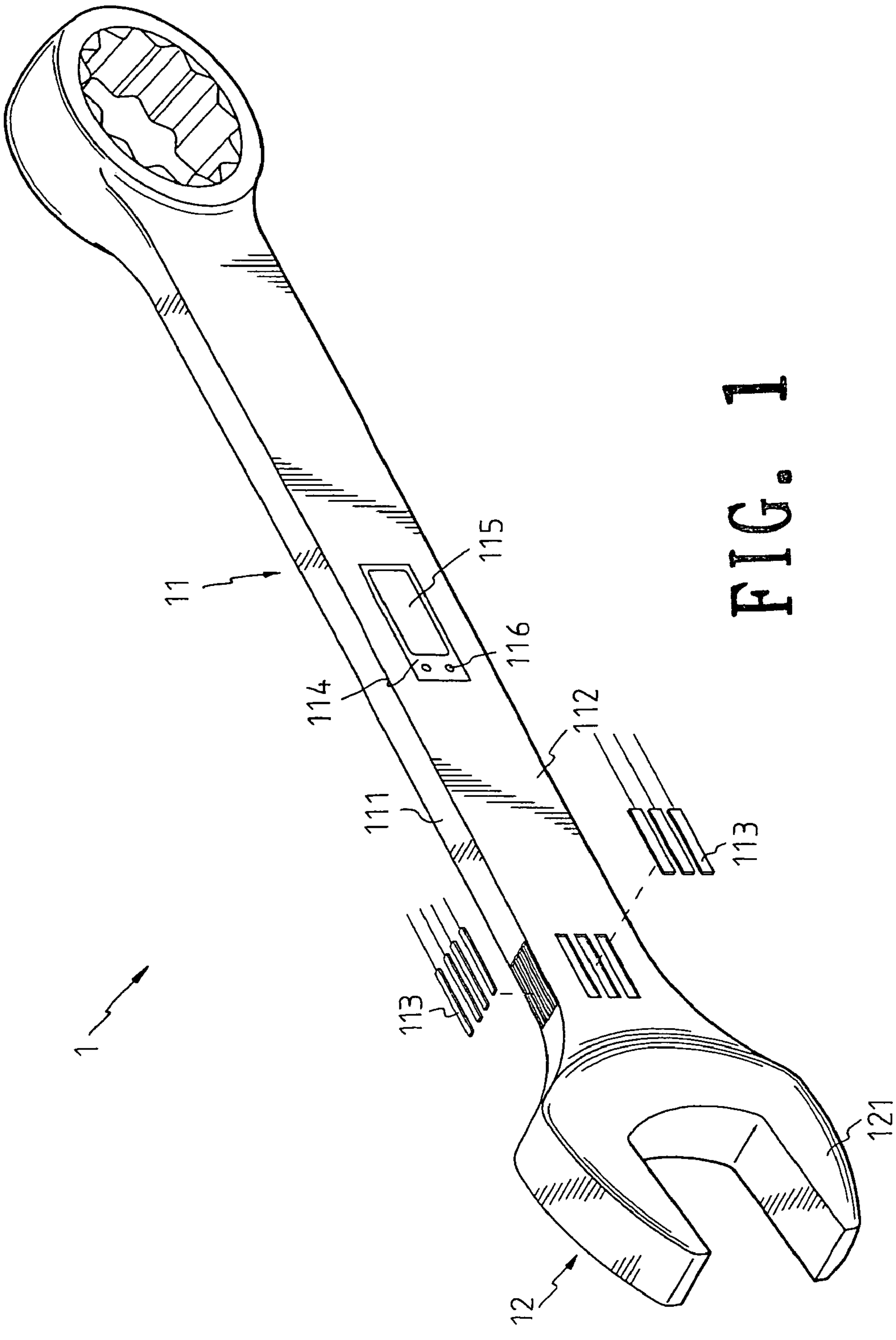
FIG. 1 is an exploded perspective view of the hand tool with twisting force measuring functions of the present invention.
Figure 2:
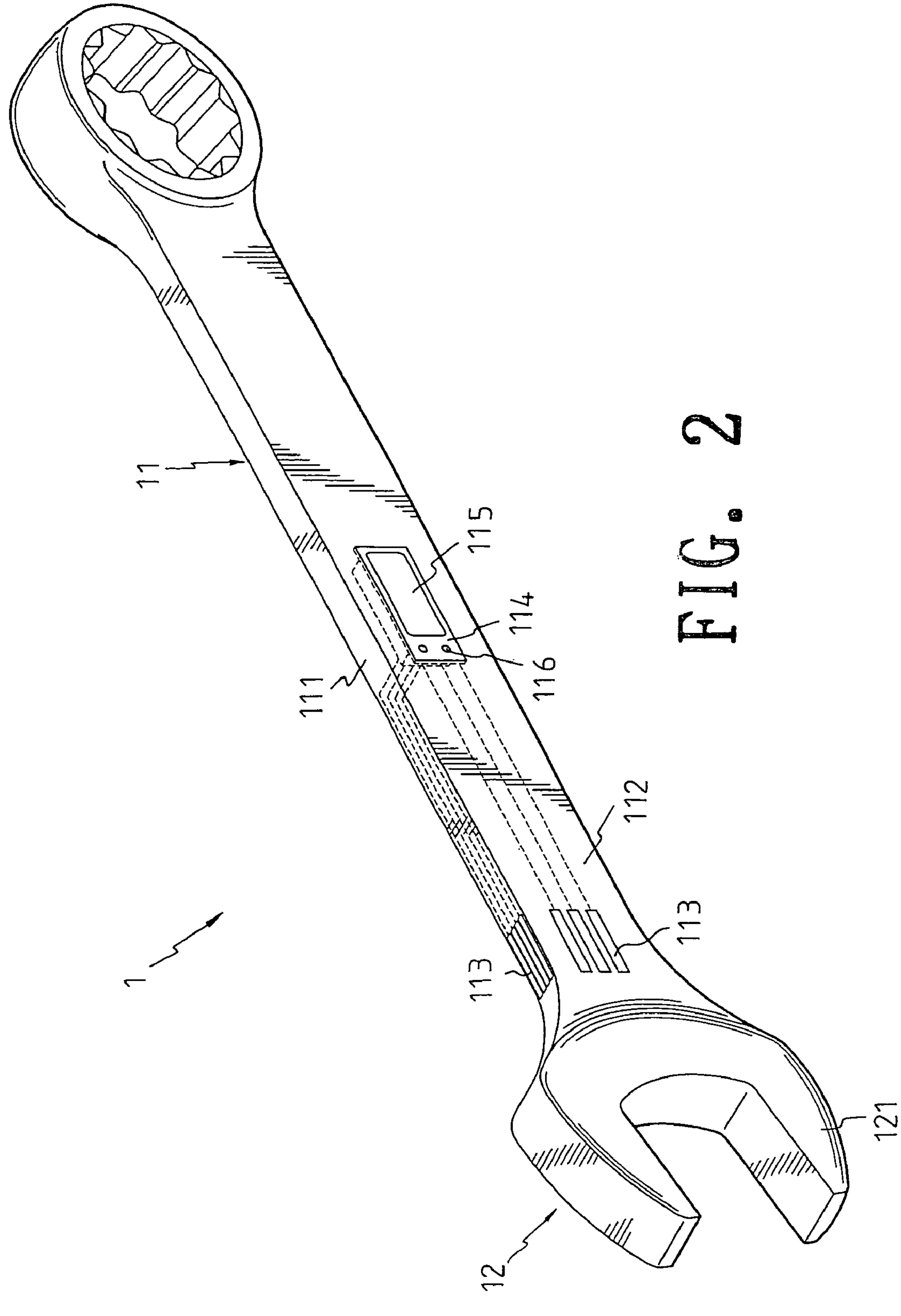
FIG. 2 is a perspective view of hand tool with twisting force measuring functions of the present invention.

Referring to FIGS. 1 and 2, the structure of the present invention is illustrated. The present invention has the following elements.

A driving portion 12 has a driving head 121 for screwing a screwing elements. In this embodiment, the driving head 121 is a spanner with an opened end.

A handle 11 is connected to the driving portion 12. The handle 11 has four lateral sides including a first lateral side 111 and a second lateral side 112 adjacent to the first lateral side 111.

Four strain gauges 113 are installed in the first lateral side 111 and are located near the driving portion 12. Three strain gauges 113 are installed in the second lateral side 112 and are near the driving portion 12.

An integrating element 114 is installed on the handle 11. The integrating element 114 is connected to all the strain gauges 113 through conductive wires. Thereby the precise twisting force value can be measured by Wheaston bridge.

A display 115 and an adjusting button 116 are installed on the integrating element 114. The display 115 serves for display the values of the twisting forces calculated by the integrating element 114 from the measured values of the strain gauges 113. The adjusting button 116 has the functions of reset, calibration and unit-conversion of the values of twisting forces.

Figure 3:
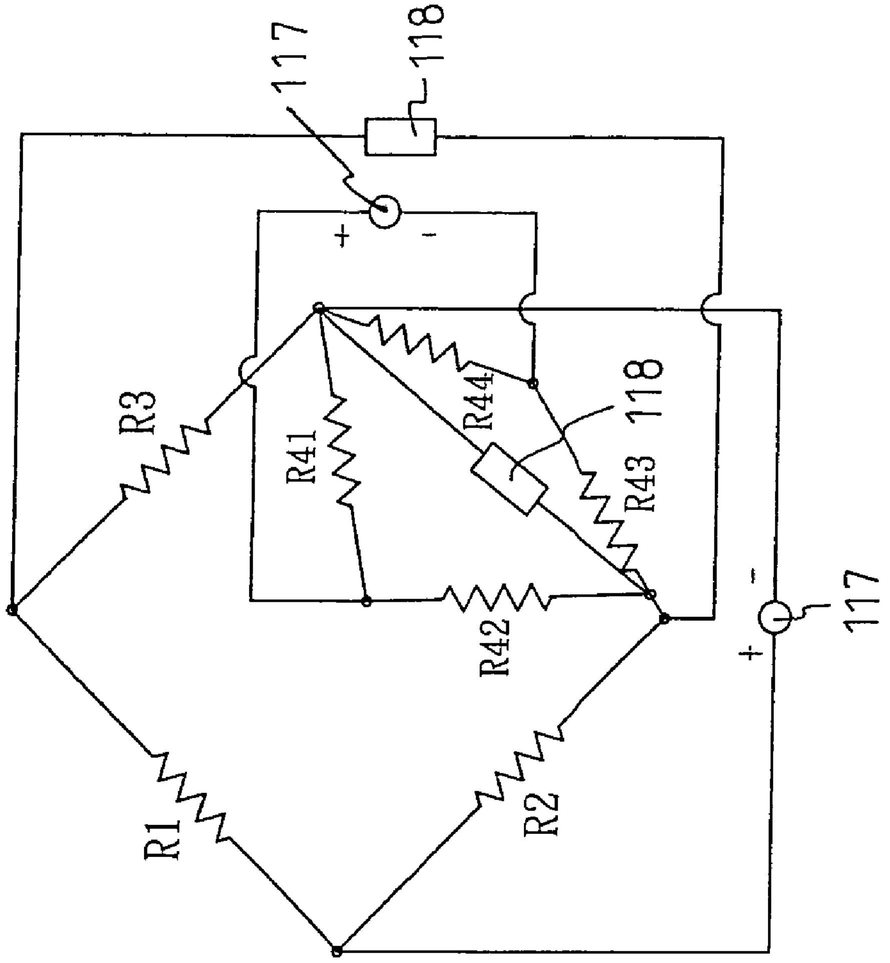
FIG. 3 shows the circuit arrangement of the hand tool with twisting force measuring functions of the present invention.

Referring to FIG. 3, a circuit diagram of the present invention is illustrated. The R1, R2 and R3 are strain gauges 113 installed at the second lateral side 112 of the handle 11. The R41, R42, R43, and R44 are installed on the first lateral side 112 of the handle 11. Two voltage sources 117 and two voltameters 118 are added to the circuit. The R1, R2 and R3 and one voltameter 118 is connected as a Wheaston bridge with a the voltameter 118 serving to measure the voltage of the Wheaston bridge due to the variation of resistance. A voltage source 117 is connected between two ends of the Wheaston bridge formed by the R1, R2, R3 and the voltameter 118. The R41, R42, R43 and R44 are connected as another Wheaston bridge with another voltameter 118 serving for measuring the voltage induced from the resistance variation. The Wheaston bridage formed by the R41, R42, R43 and R44 is connected across the voltage source 118 of the Wheaston bridge formed by the strain gauges of the second lateral side 112.

When the tool body 1 moves, the strain gauges 113 of the first lateral side 111 and the strain gauge 113 of the second lateral side 112 are installed at different planes. The forces applied thereto are different. The integrating element 114 can measure the variations thereof from different axial directions. The integrating element 114 has a precise value of twisting force.

Figure 4:
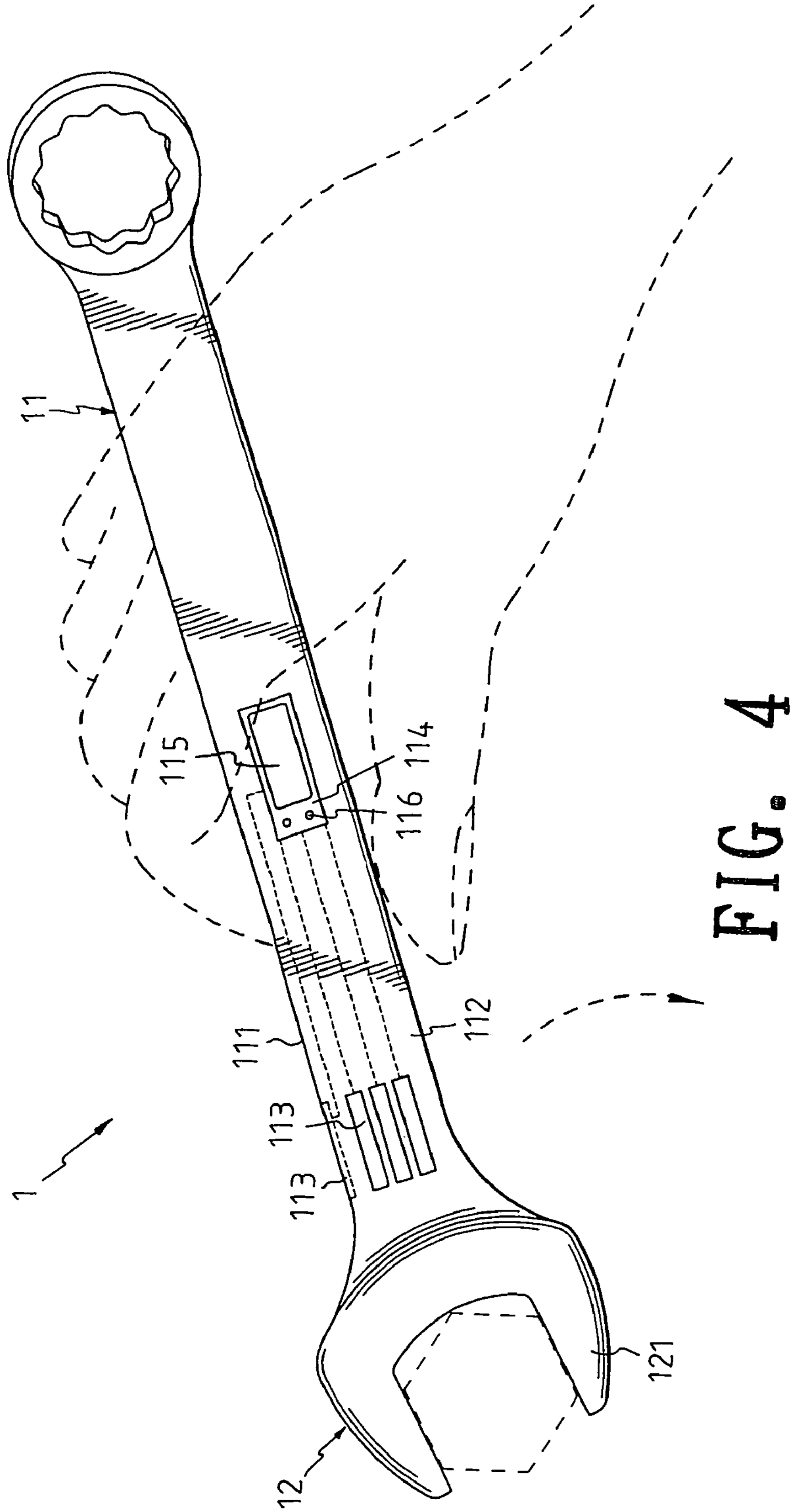
FIG. 4 is a schematic view about the operation of the hand tool with twisting force measuring functions of the present invention.

Referring to FIG. 4, a schematic view of the present invention is illustrated. When the user holds the handle 11 of the tool body 1 and one end of the handle 11 drives the driving head 121 of the driving portion 12 is engaged with a screw unit, the tool body 1 can drive the screw, the tool body 1 is slightly deformed by the action of the stress. In operation of the tool body 1, the strain gauges 113 in the first lateral side 111 and the strain gauges 113 in the second lateral side 112 suffer from different twisting forces, for example, the strain gauges 113 in the first lateral side 111 is prolonged, and the strain gauges 113 in the second lateral side 112 are bent as the tool body 1 is used. Thereby the integrating element 114 can get twisting force values in different axial directions by using the Wheaston bridges. The twisting force values are displaced on the display 115 as a reference. Thereby the force applied to the screw unit is well controlled and the tool body 1 is prevented from broken.

Furthermore, it should be noted that the numbers of the strain gauges 113 in the first lateral side 111 and second lateral side 112 are used as an example for describing the present invention. The numbers are changeable, which are within the scope of the present invention.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A hand tool with twisting force measuring functions comprising:

a driving portion having a driving head for screwing a screwing elements;

a handle connected to the driving portion; the handle including a first lateral side and a second lateral side adjacent to the first lateral side;

four strain gauges installed in the first lateral side;

three strain gauges installed in the second lateral side;

an integrating element installed on the handle for calculating twisting forces of the tool body by measuring data from the strain gauges of the first lateral side and the second lateral side;

wherein the strain gauges in the second lateral side is connected with other circuit element as a Wheaston Bridge for measuring twisting force of the hand tool wherein the strain gauges in the first lateral side is connected with other circuit element as a Wheaston Bridge for measuring twisting force of the hand tool;

wherein the Wheaston bridge of the first lateral side is connected across one element of the Wheaston bridge of the second lateral side;

wherein the integrating element is connected to all the strain gauges through conductive wires;

wherein a display and an adjusting button are installed on the integrating element; the display serves for displaying the values of the twisting forces calculated by the integrating element from the measured values of the strain gauges; the adjusting button has the functions of reset, calibration and unit-conversion of the values of twisting forces; and wherein the driving head is a spanner with an opened end and another end of the spanner has a ring so as to form a ring spanner.

* * * * *